(12) United States Patent
Muckle et al.

(10) Patent No.: US 9,182,059 B2
(45) Date of Patent: Nov. 10, 2015

(54) ADAPTOR ASSEMBLY

(75) Inventors: Derek Muckle, Long Whatton (GB); Andrew Jenner, Alfreton (GB)

(73) Assignee: Radius Systems Limited, Alfreton (GB)

( * ) Notice: Subject to any disclaimer, the term of this patent is extended or adjusted under 35 U.S.C. 154(b) by 347 days.

(21) Appl. No.: 13/643,533

(22) PCT Filed: Apr. 26, 2011

(86) PCT No.: PCT/GB2011/050821
§ 371 (c)(1),
(2), (4) Date: Feb. 27, 2013

(87) PCT Pub. No.: WO2011/135350
PCT Pub. Date: Nov. 3, 2011

(65) Prior Publication Data
US 2013/0154254 A1 Jun. 20, 2013

(30) Foreign Application Priority Data

Apr. 29, 2010 (GB) .................................. 1007161.1

(51) Int. Cl.
*F16L 19/065* (2006.01)
*F16L 19/025* (2006.01)

(52) U.S. Cl.
CPC .............. *F16L 19/025* (2013.01); *F16L 19/065* (2013.01); *Y10T 29/49826* (2015.01)

(58) Field of Classification Search
CPC ........ F16L 19/06; F16L 19/065; F16L 19/083
USPC .................. 285/249, 339, 323, 255, 341, 343
See application file for complete search history.

(56) References Cited

U.S. PATENT DOCUMENTS 1,675,808 A     7/1928  Kliss
2,120,275 A  *  6/1938  Cowles ......................... 285/323

(Continued)

FOREIGN PATENT DOCUMENTS

FR     2700379 A3    7/1994
GB     2095780 A     10/1982

(Continued)

OTHER PUBLICATIONS

International Bureau of WIPO, International Report on Patentability of PCT/GB2011/050821, Nov. 8, 2012, Switzerland, 8 pages.

(Continued)

*Primary Examiner* — David E Bochna
(74) *Attorney, Agent, or Firm* — Alleman Hall McCoy Russell & Tuttle LLP

(57) ABSTRACT

An adaptor assembly to be fitted onto a service pipe comprising a host pipe lined with a lining pipe is provided. The adaptor assembly includes a body to seal with the host pipe, a bore extending along a longitudinal axis of said body, and a compression element mountable on and displaceable relative to the body. The adaptor assembly includes an axially translatable piston, an annular flange protruding into said bore, and a grip ring disposable between said piston and said flange and having an inner radial surface to grip an outer radial surface of the lining pipe. A slip spacer is disposable between the compression element and the piston to transmit axial load but substantially prevent transmission of torque therebetween. The compression element is moveable to axially displace the piston causing the grip ring to bear against the inclined annular flange and grip radially inwardly against the outer radial surface.

25 Claims, 3 Drawing Sheets

(56) References Cited

U.S. PATENT DOCUMENTS

| | | | |
|---|---|---|---|
| 2,394,351 A * | 2/1946 | Wurzburger | 285/341 |
| 2,610,869 A * | 9/1952 | Allison | 285/249 |
| 4,606,564 A * | 8/1986 | Kurachi | 285/249 |
| 4,655,486 A | 4/1987 | Tarnay et al. | |
| 2009/0174154 A1 * | 7/2009 | Chiu | 277/603 |

FOREIGN PATENT DOCUMENTS

| | | |
|---|---|---|
| GB | 2447275 A | 9/2008 |
| GB | 2467536 A | 8/2010 |
| JP | 2000257781 A | 9/2000 |
| WO | 9503508 A1 | 2/1995 |
| WO | 2007084183 A1 | 7/2007 |
| WO | 2008107680 A2 | 9/2008 |

OTHER PUBLICATIONS

ISA European Patent Office, International Search Report of PCT/GB2011/050821, Jul. 28, 2011, WIPO, 2 pages.

UK Intellectual Property Office, Search Report of GB1007161.1, Aug. 16, 2010, 2 pages.

* cited by examiner

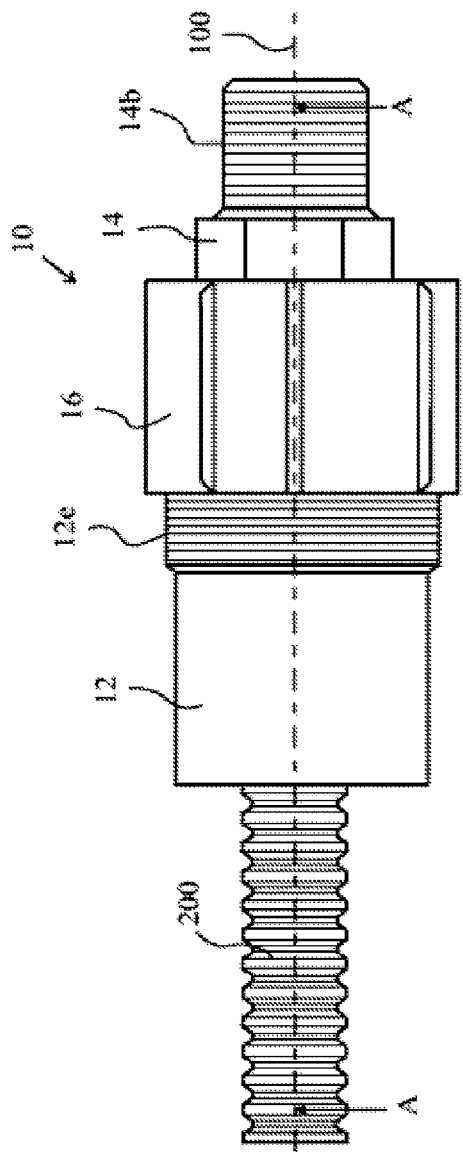
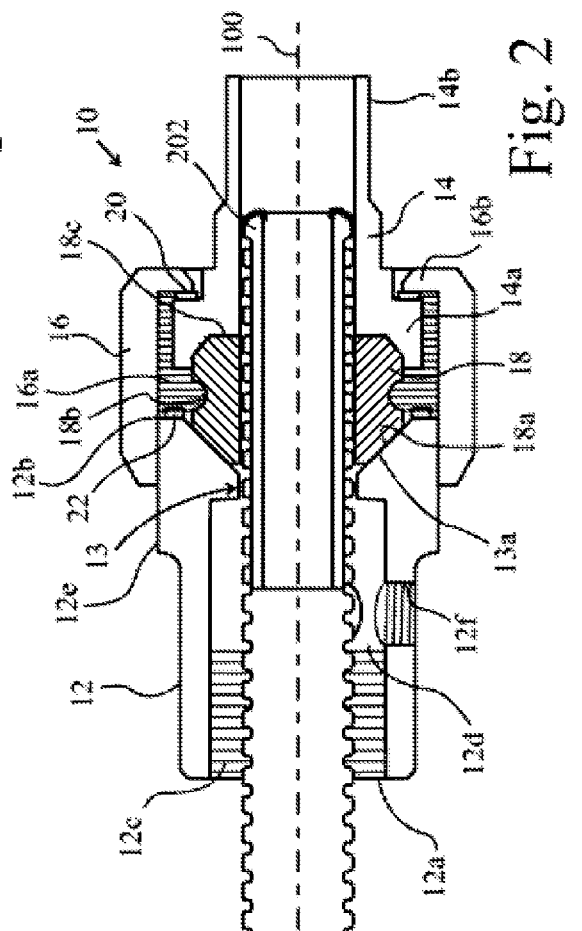
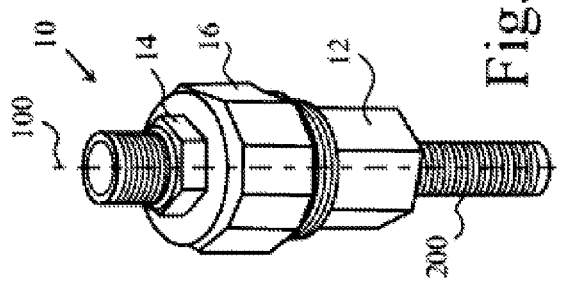
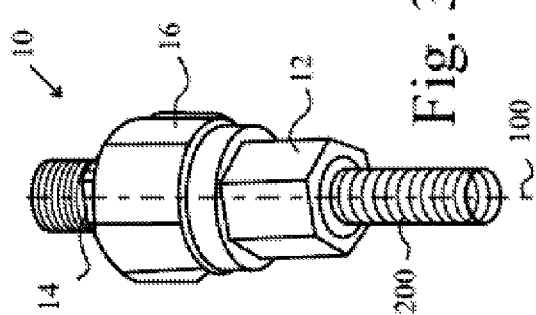

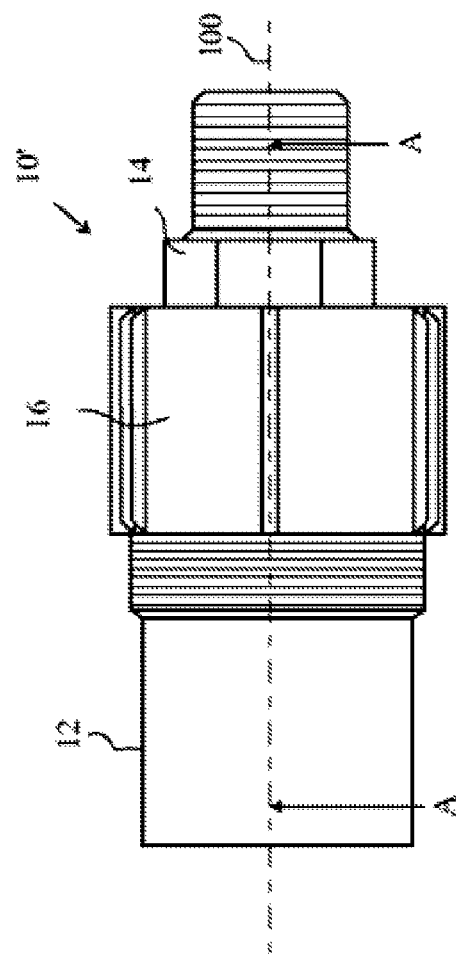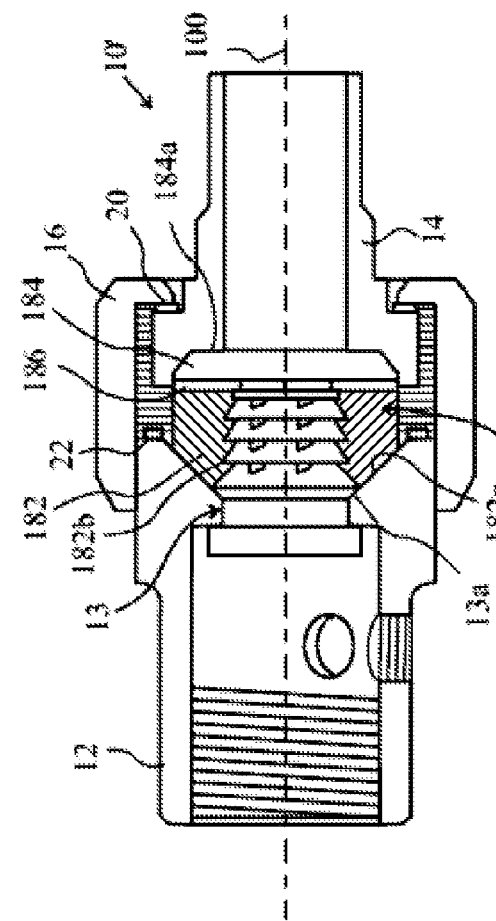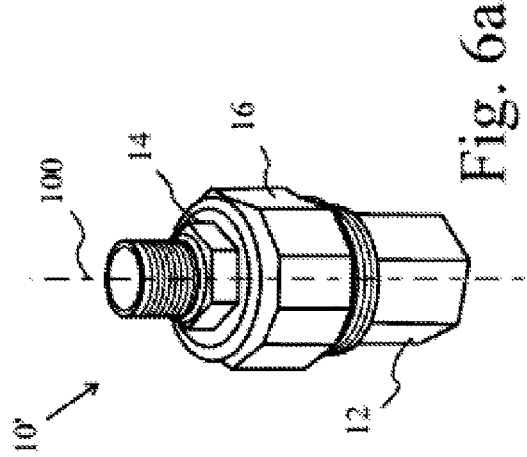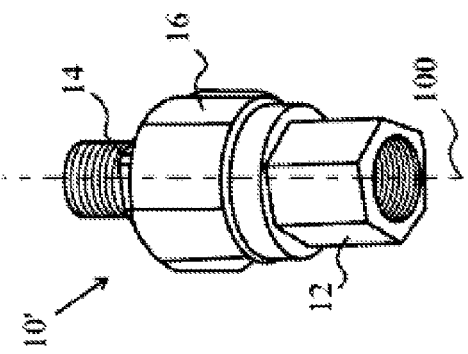

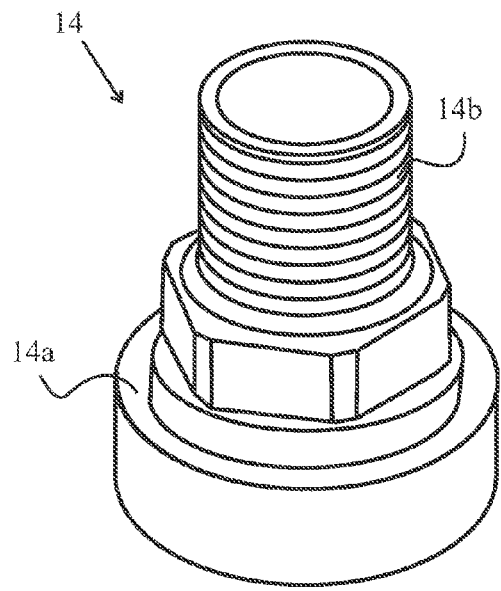
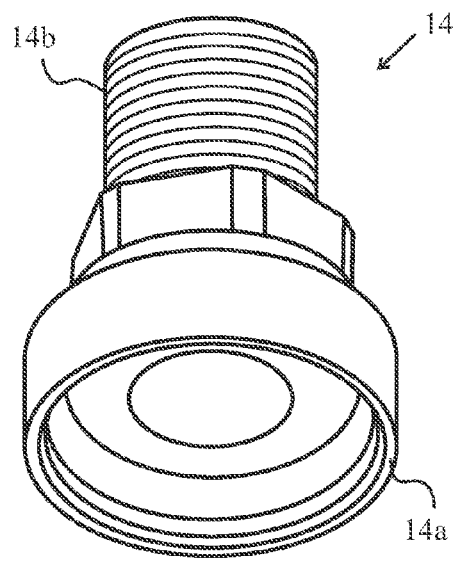
Fig. 7a                Fig. 7b
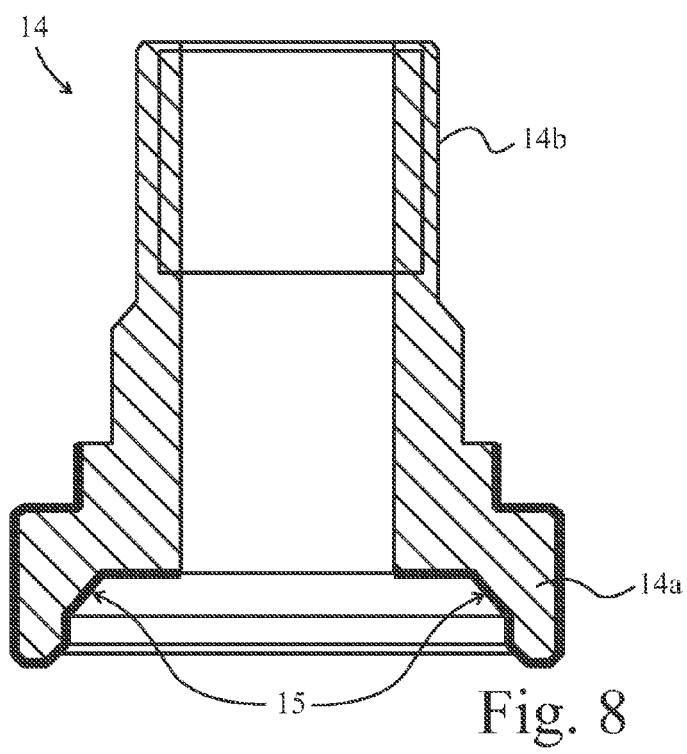
Fig. 8

ADAPTOR ASSEMBLY

CROSS-REFERENCE TO RELATED APPLICATIONS

The present application is the U.S. National Phase of International PCT Application Serial No. PCT/GB2011/050821, filed Apr. 26, 2011, which claims priority to GB Application No. 1007161.1, filed Apr. 29, 2010, the disclosures of each of which are hereby incorporated by reference in their entirety for all purposes.

This invention relates to an adaptor for connecting a pipe to a fitting, in particular for connecting and sealing a service pipe (comprising a host pipe and a lining pipe) with a fitting.

BACKGROUND

It is becoming increasingly desirable and necessary to replace or reline metallic gas and water pipes with plastic pipes that are lighter, less susceptible to corrosion and easier to handle and manipulate. Indeed, various regulations and legislation set out strict rules and conditions regarding the nature of pipes that are situated in and around domestic buildings. For example, within UK houses there is the requirement that gas must be contained within pipes having a metal sheath.

In some circumstances, old underground metal pipes are simply dug up to be replaced with plastic counterparts (using "open-cut" techniques). In other situations, where it is desirable, necessary or simply more convenient to leave the metallic pipes in place, they are relined with a plastic pipes. The process of relining a metal pipe with a plastic one has several advantages over replacing the metal pipe entirely with a plastic one. In particular, the new plastic pipe can be threaded through the existing metal pipe thereby negating the requirement to dig up the old pipe and install and set the new one. Of course, this method is more cost effective, in addition to being more convenient.

However, it is found that the introduction of a lining pipe having a smaller diameter than the host pipe, leads to an inevitable increase in head loss. Head loss is the fluid pressure lost along a length of pipe due to friction. It is directly proportional to the length of the pipe and inversely proportional to the diameter of the pipe. Therefore, the longer and narrower a pipe is, the greater the head loss will be.

In the gas industry, ¾" [19 mm] diameter metallic service pipes are typically relined with 16 mm diameter polyethylene (PE) pipes (where diameters are approximate inner diameters). The length of the 16 mm PE pipe is generally not limited and so the head loss incurred in these installations is often excessive. The potential for excessive head losses has led to the prohibition of such practice in some areas, leaving expensive open cut techniques as alternatives.

Other problems are associated with providing an effective and adequate joint from the new plastic service pipe to a fitting, such as a valve or meter, for example. These so-called service head adaptors are well known in the prior art, and a sample of which is described below.

The Draw Lock® Service Insertion Adaptor by Georg Fischer Fittings (www.fittings.at) provides a fitting that attaches to the end of a steel stand pipe having a PE interior lining pipe. The fitting allows the service pipe to be connected to a domestic fitting such as a meter. To seal the service insertion adaptor to the end of the service pipe, the user first inserts the adaptor over the PE pipe and then screws it tightly on to the steel riser. The PE pipe extending from the top of the adaptor is then cut flush with the top of the adaptor. A copper liner, expander and adaptor bush is assembled onto a draw tool and then inserted into the bore of the PE pipe until the adaptor bush rests on the top of the service insertion adaptor. The user then uses a spanner to rotate the draw tool relative the adaptor. The expander, which is a conical nut, moves through the copper liner and expands it forming a joint. The draw tool, expander and adaptor bush are then removed leaving the expanded copper liner in place within the PE pipe. The fitting and PE pipe are then sealed with respect to the steel stand pipe allowing a meter control valve, for example, to be installed.

Another type of adaptor is the Serviflex® Service Insertion Adaptor, also by Georg Fischer (www.fittings.at). This adaptor is specifically designed for use with steel pipes that are lined with Serviflex® pipes provided by Radius Systems Limited. To install the Serviflex® Service Insertion Adaptor to such a pipe, the Serviflex® pipe must first be cut so that 6" (150 mm) protrudes from the steel service pipe. An adaptor body is then fitted to the steel service pipe and a seal and washer are inserted over the Serviflex® pipe and into the adaptor body. The washer has a "lug" that protrudes radially from it that fits into a complementary groove in the adaptor body to prevent rotation therebetween. The Serviflex® pipe is then cut just above the top of the adaptor body before a metallic insert is inserted into the end of the Serviflex® pipe. A fire resistant washer is then placed on top of the adaptor body and a nipple is tightened down onto the body compressing the fire resistant washer. The downward moving nipple causes the washer to move downwards compressing the seal below causing it to deform radially inwards against the Serviflex® pipe and insert. The washer is prevented from rotating within the adaptor body and so only moves downwards against the seal, thereby not transmitting any rotational movement to the seal or the Serviflex® pipe. The Serviflex® Service Insertion Adaptor does not require any specialist tooling for installation.

Similarly, the Live Insertion Service Adaptor from WASK-RMF (http://www.wask-uk.com/) does not require a specialist tool to make a connection with a service pipe and relies on a compression fitting. The WASK-RMF Live Insertion Service Adaptor comprises a body that is slid over a lining pipe of a service pipe and screwed onto the surrounding metallic pipe. A copper insert is slotted into the open end of the lining pipe and a nipple is screwed axially into the body using an appropriately sized spanner. The axial movement of the nipple causes a captive olive, within the body, to compress radially and tighten against the lining pipe. The captive olive has a serrated inner surface that engages with the lining pipe.

In the document WO-A-2008/107680 (Corus UK Limited), a compression fitting is described for connecting steel pipes as a first fit device. The Corus device has a housing with a bore for receiving a steel pipe, where the bore is provided with a seat. A deformable sealing ring sits on top of the seat beneath a washer and a grip ring. To establish a sealed connection with the steel pipe, a nut is screwed onto the assembly. The nut has an internal taper that abuts the grip ring and urges it radially inwards against the surface of the steel pipe. The grip ring comprises sharp teeth that project radially inwards that bite into the surface of the steel pipe. Screwing the nut further pushes the grip ring axially down onto the washer and the sealing ring. Since, at this point, the grip ring is biting into the surface of the steel pipe, further rotation of the nut causes the pipe to move axially. In addition, the rotating nut will exert a torque on the grip ring and therefore on the pipe. The axially moving grip ring and washer causes the sealing ring to become compressed between the washer and the seat and deform to form a seal.

It is an object of the present invention to provide an improved adaptor for producing a seal at the end of a service pipe that has a lining pipe, where no additional tools are required to fit the adaptor, and the seal is efficient and effective whilst minimising the risk of pipe failure. In particular, it is desirable to form a secure joint between the adaptor and the lining pipe without using excessive forces, thereby not compromising the integrity of the lining pipe. It is also particularly desirable that substantially no rotational forces are transmitted to the lining pipe when establishing a secure sealed connection.

In some cases, it may be desirable to electrically isolate the metallic host pipe from an auxiliary pipe system. In particular, in domestic gas systems, it is desirable to have the system electrically isolated. Indeed, in certain jurisdictions, it is a regulatory requirement that the metallic service pipe is electrically isolated from the auxiliary pipe system.

Current methods for isolating a domestic gas system involve fitting a specialised piece of apparatus in between the service head adaptor and the domestic gas system where the specialised apparatus comprises at least one electrically insulating component. In practice, the use of an additional piece of apparatus for electrical isolation is inconvenient (and in many cases impractical), whilst adding to the complexity of connecting a service pipe to a domestic pipe system and increasing the number of potential leak paths.

It is therefore a further object of the present invention to provide a more convenient and robust way of electrically isolating an auxiliary pipe system from a service pipe when making a connection therebetween.

BRIEF SUMMARY OF THE DISCLOSURE

In accordance with a first aspect of the present invention, there is provided an adaptor assembly adapted to be fitted onto a service pipe, where the service pipe comprises a host pipe that is lined with an interior lining pipe;
said adaptor assembly including:
a body that is adapted to form a seal with the host pipe;
a bore extending along a longitudinal axis of said body;
a compression element mountable on said body so as to be rotatably and axially displaceable relative to the body;
a piston that is axially translatable relative to said body;
an annular flange protruding radially inwards from said body into said bore, wherein the annular flange is inclined in a direction generally parallel to said longitudinal axis;
a grip ring disposable between said piston and said flange, said grip ring having an inner radial surface adapted to bear against and grip an outer radial surface of the lining pipe during use; and
a first slip spacer disposable between the compression element and the piston to allow the transmission of axial load from the compression element to the piston but to substantially prevent the transmission of torque therebetween;
wherein the compression element is rotatably and axially moveable relative to said body to axially displace the piston relative to the body causing the grip ring to bear against the inclined annular flange and grip radially inwardly against the outer radial surface of the lining pipe during use.

The adaptor assembly can therefore be used to establish a mechanical grip and a gas tight seal to a lining pipe of a service pipe.

Preferably, the first slip spacer is a first slip washer, although in alternative embodiments, the first slip spacer may be any ring-like element that is capable of transferring axial load from the piston to the compression element but substantially preventing the transfer of torque there between. The first slip washer will also provide some sealing, in the event that the grip ring is not completely gas tight.

Further preferably, the first slip spacer is electrically insulating. An electrically insulating first slip spacer will assist in electrically isolating the piston from the compression element, and consequently the host pipe. In a particularly preferable embodiment, the first slip spacer is fire proof, preferably being resistant to temperatures of up to 850° C. The fire proof spacer will improve the safety of the adaptor assembly in the event that gas is ignited.

In a particularly preferable embodiment, the piston has an electrically insulating coating covering at least a portion of the surface of the piston. Further preferably, the electrically insulating coating is a ceramic coating. The electrically insulating coating electrically isolates the piston from the compression nut and the body, and therefore the host pipe, which is usually metallic. Consequently, the auxiliary pipe system or further apparatus that the adaptor assembly might be connected to will be electrically isolated from the host pipe thereby minimising the risk of spark generation which could lead to fires or explosions.

Preferably, the piston has connecting means for connecting the adaptor assembly to an auxiliary pipe system. Further preferably, the connecting means includes a screw thread on the piston. In these preferable embodiments, the adaptor assembly can be connected to an auxiliary pipe system, such as a domestic gas system, or a further piece of apparatus, such as a meter.

In one particularly preferable embodiment, the grip ring comprises deformable rubber. Deformable rubber is particularly suited to forming a mechanical grip and a gas tight seal with a flexible plastics lining pipe, such as a Serviflex® pipe provided by Radius Systems Limited.

In an alternative preferable embodiment, the grip ring comprises a deformable rubber component, a deformable plastics component, and a second washer disposed between the rubber component and the plastics component. The grip ring of this embodiment is particularly suited to forming mechanical grip and a gas tight seal with a solid walled lining pipe. In particular, the plastics component provides a more rigid and resilient gripping element compared to the rubber component for gripping the lining pipe, which may be required for solid walled lining pipes. The rubber component serves to assist in forming a gas tight seal around the lining pipe. Indeed, the plastics component will also provide a certain degree of sealing and the rubber component will provide a certain degree of gripping, likewise. Therefore, the combination of the plastics component and the rubber component provide a suitable means for gripping and sealing a solid walled lining pipe. The second washer prevents the deforming rubber component from interfering with the plastics component whilst is closes radially around the lining pipe. In a particularly preferable embodiment, the second washer is a second slip washer that allows the transmission of axial load between the rubber and plastics components but substantially prevents the transmission of torque therebetween. Therefore, in the event that some torque is transferred from the compression element to the rubber component, the second slip washer will substantially prevent the torque from being transferred to the plastics component that forms the main gripping part of the grip ring.

In a further preferable embodiment, the adaptor assembly further includes a third washer disposable between the piston and the body, wherein the third washer is preferably electrically insulating and/or preferably a fire proof washer, preferably being resistant to temperatures of up to 850° C. The third washer will prevent the piston from contacting the body and will improve the safety characteristics of the adaptor assembly in embodiments where the third washer is a fire proof washer.

In the event that the piston has an electrically insulating coating, the first slip spacer and third washer (if present) will protect the coating from damage, by preventing the piston from contacting the compression nut and the body.

In a particularly preferable embodiment, the compression element is a compression nut screwable on said body. The compression nut can then be screwed onto a screw thread on the body to rotatably and axially move the compression nut relative to the body to axially move the piston. In use, it is particularly preferable for the piston to be arranged in the assembly so that a clearance gap is maintained between the piston and the compression element in any direction. Preferably, the clearance gap in any direction is 2.5 mm or greater. Further preferably, the clearance gap in any direction is 3.0 mm or greater. The clearance gap increases the amount of non-conducting media between the piston and the compression element and reduces the risk of electrical arcing. Additionally, the clearance gap keeps the piston and the compression element spatially separated thereby preventing the electrically insulating coating from being damaged through contact with the compression element (particularly the internal thread of the compression nut, in certain embodiments). As described above, the first slip spacer may also contribute to the spatial separation and electrical isolation of the piston relative to the compression element.

In one preferable embodiment, the adaptor assembly further comprises a rigid pipe insert for insertion in the end of the lining pipe. The rigid pipe insert provides a reaction surface for the grip ring to bear against in cases where the lining pipe is soft and/or flexible. In these situations, the lining pipe will be gripped between the grip ring and the rigid pipe insert.

The body preferably includes one or more radial holes for introducing a filling material into an annulus between the host pipe and the lining pipe. In a particularly preferable embodiment, the filling material is grout.

In accordance with a second aspect of the present invention there is provided a kit including an adaptor assembly according to the first aspect of the present invention, and at least one further grip ring interchangeable with said grip ring disposable between the piston and the flange. Preferably, two or more of the grip rings are of different sizes prior to a load being applied. Further or alternatively preferably, two or more of the grip rings comprise different materials to one another. Thus, a single adaptor assembly can be provided that has a plurality of grip rings, where the grip rings are preferably different to one another in some respect. A suitable grip ring can be selected for a particular lining pipe allowing the adaptor assembly to be used universally on a wide variety of lining pipes.

In accordance with a third aspect of the present invention there is provided a method of attaching the adaptor assembly of any of the preceding claims to a service pipe, the method including the steps of:

(i) cutting the interior lining pipe so that a length of lining pipe protrudes from the host pipe;
(ii) attaching and sealing the body to the host pipe such that said lining pipe extends into the bore;
(iii) seating the grip ring on the inclined annular flange and positioning the piston on the grip ring so that the grip ring is disposed between the piston and the flange;
(iv) installing the first slip spacer on the piston and mounting the compression element onto the body so that the first slip spacer is disposed between the compression element and the piston;
(v) rotatably and axially moving the compression element on the body to axially displace the piston relative to the body, whereby the axial displacement of the piston causes the grip ring to bear against the inclined annular flange and grip radially inwardly against an outer radial surface of the lining pipe and form a seal therebetween.

Preferably, the adaptor assembly includes a rigid pipe insert, and the method further includes the step of inserting the rigid pipe insert into the end of the lining pipe after step (i) and before step (ii).

BRIEF DESCRIPTION OF THE DRAWINGS

Embodiments of the invention are further described hereinafter with reference to the accompanying drawings, in which:

FIG. 1 shows an embodiment of a service head adaptor in accordance with the present invention attached to a flexible lining pipe, where the host pipe is omitted for clarity;

FIG. 2 is a cross sectional view of the service head adaptor of FIG. 1 as viewed along line A-A;

FIGS. 3A and 3B are perspective views of the service head adaptor of FIGS. 1 and 2;

FIG. 4 shows an alternative embodiment of a service head adaptor in accordance with the present invention, where the host pipe and lining pipe are omitted for clarity;

FIG. 5 is a cross sectional view of the service head adaptor of FIG. 4 as viewed along line A-A;

FIGS. 6A and 6B are perspective views of the service head adaptor of FIGS. 4 and 5;

FIGS. 7A and 7B are perspective views of the piston of the service head adaptor; and FIG. 8 is a cross sectional view of the piston of FIGS. 7A and 7B showing the location of the insulating coating.

DETAILED DESCRIPTION

FIGS. 1 to 3 show a first embodiment of a service head adaptor assembly 10 according to the present invention. The service head adaptor assembly 10 has a body 12 with a first end 12a that is adapted to form a seal with a host pipe (not shown) of a service pipe. In the embodiments shown in the figures, the first end 12a has an internal screw thread 12c that is adapted to attach to and form a seal with the host pipe via a complementary screw thread. The body 12 has a bore 12d that extends along a longitudinal axis 100 and receives a lining pipe 200 of the service pipe when the host pipe is attached to the body 12. An internal annular flange 13 extends radially inwards from the body 12 (towards the longitudinal axis 100) and has an inclined surface 13a, where the direction of the incline is parallel to the longitudinal axis 100 towards the first end 12a of the body 12. A second end 12b of the body 12 is adapted to connect to and form a seal with a compression nut 16. In alternative embodiments, the compression nut 16 may be replaced by any compression element that is mountable on the body 12 so as to be rotatably and axially displaceable relative to the body 12.

In the embodiments shown in the figures, the second end 12b has an external screw thread 12e that screws onto a complementary internal screw thread 16a of the compression nut 16. The compression nut 16 is screwable on the body 12 so as to be axially translatable relative to the body 12 in a direction parallel to the longitudinal axis 100. The compression nut 16 is tubular and also has a flange 16b that extends radially inwardly.

As shown in FIG. 2, the adaptor assembly 10 further includes a grip ring 18 that sits on the inclined surface 13a of the flange 13. The grip ring 18 is made of deformable rubber material and has a first inclined surface 18a that is complementary to the inclined surface 13a of the flange 13 permitting a large degree of contact between the flange 13 and the grip ring 18. The grip ring 18 is also tubular in shape, having a central bore that is sized to allow the lining pipe 200 to pass therethrough. The grip ring 18 further includes an annular external groove 18b that facilitates deformation of the grip ring 18 along an axial direction.

A piston 14 is seated on a second surface 18c of the grip ring 18, where the second surface 18c is distal to the first inclined surface 18a. The piston 14 has a flange 14a extending radially outwardly so as to be in axial alignment with the flange 16b of the compression nut 16 when the compression nut 16 and the piston 14 are assembled on the body 12. As shown in FIG. 2, in an assembled configuration, the grip ring 18 and the piston 14 are restricted axially by the flange 16b of the compression nut 16. A first slip washer 20 is disposed between the flange 14a of the piston 14 and the flange 16b of the compression nut. In preferable embodiments, the first slip washer 20 is fireproof, retaining its integrity at temperatures of up to 850° C. The first slip washer 20 permits the transmission of axial load from the compression nut 16 to the piston 14, but substantially prevents the transmission of torque therebetween. Therefore, the compression nut 16 may be screwed onto the body 12 to axially move the piston 14 closer to the body 12, whilst substantially preventing any torque being transferred to the piston 14 (i.e. the piston 14 remains substantially rotationally fixed whilst moving axially).

In alternative embodiments, the first slip washer 20 may be slip spacer that allows axial load to be transmitted between the compression nut 16 and the piston 14 but substantially prevent transmission of torque therebetween. In one alternative embodiment, for example, the slip spacer may include an arrangement of ball bearings. The first slip washer 20 (or slip spacer) may form part of the compression nut 16 or the piston 14, or be an independent component as shown in the Figures.

Since the grip ring 18 is made of a deformable rubber material, applied load mostly causes resilient deformation rather than compression. So, when the axially moving piston 14 applies an axial load to the grip ring 18, the grip ring 18 is forced against the inclined surface 13a of the flange and consequently deforms radially inwardly. Additionally, the flange 14a of the piston 14 extends axially around the outer radial surface of the grip ring 18 so as to restrain the grip ring 18, to a certain extent, in an outwardly radial direction. Therefore, the grip ring 18 will be permitted to deform about the annular groove 18b and deform radially inwardly, being restrained in a radially outward direction by both the flange 14a of the piston 14 and the inclined surface 13a of the flange 13. Thus, the grip ring 18 can be caused to deform radially inwardly as a result of screwing the compression nut 16 onto the body 12. By virtue of the first slip washer 20, substantially no torque is transferred from the rotating compression nut 16 to the grip ring 18. Consequently, the grip ring 18 is prevented from twisting and deforming radially inwards in a non-uniform fashion. In alternative embodiments, the annular groove 18b may not be present.

In order to assemble the adaptor assembly 10 on a service pipe, the service pipe should be prepared so that the interior lining pipe 200 protrudes from end of the host pipe. Preferably, the lining pipe 200 is cut square and a rigid pipe insert 202 is inserted into its end prior to assembly of the adaptor assembly 10. Once the service pipe is prepared, the body 12 is screwed onto the host pipe so that the lining pipe 200 extends through the bore 12d and out of the other end of the body 12.

Next, the grip ring 18 is positioned on the flange 13 so that the first inclined surface 18a of the grip ring 18 is adjacent to the inclined surface 13a of the annular flange 13. The piston 14 is then positioned on the seated grip ring 18 and the first slip washer 20 is placed on the piston 14. Finally, the compression nut 16 is positioned around the grip ring 18 and the piston 14, and is screwed onto the body 12 thereby axially restraining the grip ring 18 and the piston 14. In alternative embodiments where a compression element other than a compression nut is used, the compression element will also axially restrain the piston 14 and grip ring 18 when mounted on the body 12. In alternative methods, the adaptor assembly 10 may be assembled prior to attaching the body 12 onto the host pipe.

The lining pipe 200 is preferably positioned so that it passes entirely through the grip ring 18. Further preferably, if a rigid pipe insert 202 is used, the rigid pipe insert 202 should be positioned to be adjacent to the grip ring 18 in the assembled adaptor assembly 10.

To establish a sealed connection with the service pipe, the compression nut 16 is screwed onto the body 12 causing the piston 14 to move axially parallel to the longitudinal axis 100 towards the body 12. In doing so, the moving piston 14 applies an axial force to the grip ring 18 and causes it to deform radially inwardly so that an inner radial surface of the grip ring 18 bears against and grips the outer radial surface of the lining pipe 200. In embodiments where a rigid pipe insert 202 is in place, the lining pipe 200 is gripped between the deformed grip ring 18 and the rigid pipe insert 202. In addition to gripping, the deformed grip ring 18 forms a gas tight seal around the lining pipe 200. An external screw thread 14b on the piston 14 can then be attached to an auxiliary pipe system such as a domestic gas system. Alternatively, the piston 14 may comprise an alternative attachment means for connecting to an auxiliary pipe system, provided that a gas tight seal can be established. Similarly, in alternative embodiments, the screw thread 12c of the body 12 may be replaced with alternative attachment means for establishing a gas tight connection with the host pipe.

The body 12 further includes one or more radial holes 12f that may be used for introducing a filler material, such as grout, into the annulus between the host pipe and the lining pipe 200 once a sealed connection with the adaptor assembly 10 has been established. The radial holes 12f may be sealed after the filling material has been introduced.

FIGS. 7A, 7B and 8 show detailed views of the piston 14. As shown in FIG. 8, the flange 14a and surround surfaces of the piston are coated with an electrically insulating material 15 such as ceramic.

Returning to FIG. 2, it is shown that the piston 14 is not contact with any part of the compression nut 16 in the assembled adaptor assembly 10. The dimensions of the piston 14 are such that when it is seated on the grip ring 18 inside the compression nut 16, the piston 14 is separated from the compression nut 16 in all directions by a clearance gap. In an axial direction, the clearance gap is filled by the first slip washer 20. In the embodiments where the piston 14 has an electrically insulating coating 15, the first slip washer 20 additionally serves to prevent the coating 15 from being damaged. The clearance gap and the first slip washer 20 (if electrically insulating) provide additional non-conducting media around the piston 14 and, together with the ceramic coating 15, serve to electrically isolate the piston 14 from the compression nut 16. Consequently, when the adaptor assembly 10 is assembled, the piston 14 is electrically isolated from the body 12 and the (metallic) host pipe. The grip ring 18 will also serve to provide non-conducting media between the piston 14 and the body 12 (and therefore the compression nut 16).

Preferably, the clearance gap at any point is 2.5 mm or greater. Further preferably, the clearance gap at any point is 3.0 mm or greater.

The grip ring 18 of the adaptor assembly 10 of FIGS. 1 to 3 is particularly suited for forming seals with flexible plastics pipes such as Serviflex® pipes provided by Radius Systems Limited. The effectiveness and reliability of the seal is vastly improved with the inclusion of the rigid pipe insert 202.

FIGS. 4 to 6 show an alternative adaptor assembly 10' that is particularly suited for connection to solid walled lining pipes. As shown in FIGS. 4 to 6, the adaptor assembly 10' is identical to the adaptor assembly 10 of FIGS. 1 to 3, with the exception that the grip ring is different in each embodiment. FIG. 5 shows that the adaptor assembly 10' includes an alternative grip ring 180 that has a deformable plastics component 182 and a deformable rubber component 184. The plastics component 182 is separated axially from the rubber component 184 by a second washer 186. In this alternative embodiment, the plastics component 182 forms a first inclined surface 182a that contacts the inclined surface 13a of the flange 13, and the rubber component 184 forms a second surface 184a that contacts the piston 14. Additionally, the plastics component 182 has a plurality of inner circumferential ribs 182b that assist in gripping the lining pipe (not shown). The plastics component 182 provides a resilient and rigid gripping element for gripping a solid walled lining pipe. However, given that the plastics component 182 may not form an adequate seal with the lining pipe, the rubber component 184 is still able to deform radially inwards to assist in forming a gas tight seal with the lining pipe. The second washer 186 prevents the deforming rubber component 184 from interfering with the plastics component 182 as it deforms radially inwards around the lining pipe, when the grip ring 180 is under axial load. Therefore, the second washer 186 prevents the rubber component 184 from inhibiting the plastics component 182 from gripping around the lining pipe. In preferable embodiments, the second washer 186 is a second slip washer, wherein transmission of axial load between the rubber component 184 and the plastics component 182 is permitted, but transmission of torque therebetween is substantially prevented. Therefore, even if a small amount of torque is transferred from the compression nut 16 to the rubber component 184, then the second slip washer 186 will substantially prevent the torque being transferred to the plastics component 182, which forms the main gripping part of the grip ring 180. Consequently, the torque transferred to the lining pipe is minimised thereby reducing the risk of pipe failure.

In preferable embodiments, the second washer 186 is made from plastics material and so the alternative grip ring 180 will be electrically insulating (being made from a rubber component 184, a plastics component 182 and a plastics washer 186). In this case, the grip ring 180 will serve to electrically isolate the piston 14 from the body 12 (and therefore the compression nut 16).

In the preferable embodiments shown in FIGS. 2 and 5, a third washer 22 is disposed on the second end 12b of the body that provides a further safety seal and protect the coating 15 from being damaged. Preferably, the third washer 22 is also fireproof and retains its integrity at temperatures of up to 850° C. The third washer 22 may also be a slip washer or an equivalent slip spacer.

As described above in relation to the two embodiments shown in FIGS. 1 to 3 and FIGS. 4 to 6, the adaptor assembly of the present invention can be used to form a gas tight seal to a service pipe regardless of the type of lining pipe present. Indeed, only the grip ring needs to be changed to suit the type of lining pipe. Additionally and optionally, a rigid pipe insert may be used to improve the quality of the seal. Furthermore, the size of the grip ring employed may be modified to suit lining pipes of different diameters. The adaptor assembly of the present invention can used in conjunction with a variety of grip rings of various sizes and materials for establishing sealed connections with a variety of lining pipes. Indeed, the adaptor assembly of the present invention may be supplied as a kit with a variety of interchangeable grip rings. In this case, all components except the grip ring will be universal and may be used to connect to a wide variety of lining pipes.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A service head adaptor assembly adapted to be fitted onto a service pipe, where the service pipe comprises a metallic host pipe that is lined with an interior lining pipe, said adaptor assembly including:
   a body that is adapted to form a seal with the host pipe;
   a bore extending along a longitudinal axis of said body;
   a compression element mountable on said body so as to be rotatably and axially displaceable relative to the body;
   a piston that is axially translatable relative to said body, wherein the piston has an electrically insulating coating covering at least a portion of a surface of the piston;
   an annular flange protruding radially inwards from said body into said bore, wherein the annular flange is inclined in a direction toward said longitudinal axis;
   a grip ring disposable between said piston and said flange, said grip ring having an inner radial surface adapted to bear against and grip an outer radial surface of the lining pipe during use; and
   a first slip spacer disposable between the compression element and the piston to allow a transmission of axial load from the compression element to the piston but to substantially prevent a transmission of torque therebetween;

wherein the compression element is rotatably and axially moveable relative to said body to axially displace the piston relative to the body causing the grip ring to bear against the inclined annular flange and grip radially inwardly against the outer radial surface of the lining pipe during use.

2. The adaptor assembly according to claim 1, wherein the first slip spacer is a first slip washer.

3. The adaptor assembly according to claim 1, wherein the first slip spacer is electrically insulating.

4. The adaptor assembly according to claim 1, wherein the first slip spacer is fire proof, being resistant to temperatures of up to 850° C.

5. The adaptor assembly according to claim 1, wherein the electrically insulating coating is a ceramic coating.

6. The adaptor assembly according to claim 1, wherein the piston has connecting means for connecting the adaptor assembly to an auxiliary pipe system.

7. The adaptor assembly according to claim 6, wherein the connecting means includes a screw thread on the piston.

8. The adaptor assembly according to claim 1, wherein the grip ring comprises deformable rubber.

9. The adaptor assembly according to claim 1, wherein the grip ring comprises a deformable rubber component, a deformable plastics component, and a second washer disposed between the rubber component and the plastics component.

10. The adaptor assembly according to claim 9, wherein the second washer is a second slip washer that allows a transmission of axial load between the rubber and plastics components but substantially prevents a transmission of torque therebetween.

11. The adaptor assembly according to claim 9, further including a third washer disposable between the piston and the body.

12. The adaptor assembly according to claim 11, wherein the third washer is electrically insulating.

13. The adaptor assembly according to claim 11, wherein the third washer is a fire proof washer, being resistant up to temperatures of 850° C.

14. The adaptor assembly according to claim 1, wherein the compression element is a compression nut screwable on said body.

15. The adaptor assembly according to claim 1, wherein, in use, the piston is arranged in the assembly so that a clearance gap is maintained between the piston and the compression element in any direction.

16. The adaptor assembly according to claim 15, wherein the clearance gap in any direction is 2.5 mm or greater.

17. The adaptor assembly according to claim 16, wherein the clearance gap in any direction is 3.0 mm or greater.

18. The adaptor assembly according to claim 1, further comprising a rigid pipe insert for insertion in an end of the lining pipe.

19. The adaptor assembly according to claim 1, wherein the body includes one or more radial holes for introducing a filling material into an annulus between the host pipe and the lining pipe.

20. The adaptor assembly according to claim 19, wherein the filling material is grout.

21. A kit including the adaptor assembly according to claim 1, and at least one further grip ring interchangeable with said grip ring disposable between the piston and the flange.

22. The kit according to claim 21, wherein two or more of the grip rings are of different sizes prior to a load being applied.

23. The kit according to claim 21, wherein two or more of the grip rings comprise different materials to one another.

24. A method of attaching the adaptor assembly of claim 1 to a service pipe, the method including the steps of:
(i) cutting the interior lining pipe so that a length of lining pipe protrudes from the host pipe;
(ii) attaching and sealing the body to the host pipe such that said lining pipe extends into the bore;
(iii) seating the grip ring on the inclined annular flange and positioning the piston on the grip ring so that the grip ring is disposed between the piston and the flange;
(iv) installing the first slip spacer on the piston and mounting the compression element onto the body so that the first slip spacer is disposed between the compression element and the piston;
(v) rotatably and axially moving the compression element on the body to axially displace the piston relative to the body, whereby the axial displacement of the piston causes the grip ring to bear against the inclined annular flange and grip radially inwardly against the outer radial surface of the lining pipe and form a seal therebetween.

25. The method according to claim 24, wherein the adaptor assembly includes a rigid pipe insert for insertion in an end of the lining pipe, and the method further includes the step of inserting the rigid pipe insert into the end of the lining pipe after step (i) and before step (ii).

* * * * *